United States Patent
Chugg et al.

(10) Patent No.: US 9,503,154 B2
(45) Date of Patent: Nov. 22, 2016

(54) METHODS AND SYSTEMS FOR INTERFERENCE ESTIMATION VIA QUANTIZATION IN SPREAD-SPECTRUM SYSTEMS

(71) Applicant: TrellisWare Technologies, Inc., San Diego, CA (US)

(72) Inventors: Keith M. Chugg, La Cañada, CA (US); Cenk Kose, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

(21) Appl. No.: 14/610,553

(22) Filed: Jan. 30, 2015

(65) Prior Publication Data

US 2016/0226554 A1   Aug. 4, 2016

(51) Int. Cl.
*H04B 17/00* (2015.01)
*H04B 1/71* (2011.01)
*H04B 1/10* (2006.01)

(52) U.S. Cl.
CPC .......... *H04B 1/7101* (2013.01); *H04B 1/1036* (2013.01); *H04B 2001/1063* (2013.01); *H04B 2201/70706* (2013.01)

(58) Field of Classification Search
CPC ...................................... H04B 17/00
See application file for complete search history.

(56) References Cited

U.S. PATENT DOCUMENTS

| | | | | |
|---|---|---|---|---|
| 6,426,983 B1* | 7/2002 | Rakib | .................. | H04B 1/7102 375/346 |
| 6,791,995 B1* | 9/2004 | Azenkot | ................ | H04B 1/707 348/E5.008 |
| 2006/0083403 A1* | 4/2006 | Zhang | .................. | G06T 1/0028 382/100 |
| 2012/0014416 A1* | 1/2012 | Dabiri | ................ | H03H 21/0012 375/144 |
| 2012/0128048 A1* | 5/2012 | Dabiri | .................. | H04B 17/345 375/224 |

OTHER PUBLICATIONS

Milstein, "Interference rejection techniques in spread spectrum communications," Proc. of the IEEE, vol. 76(6), pp. 657-670, Jun. 1988.
Baier and Friederichs, "A nonlinear device to suppress strong interfering signals with arbitrary angle modulations in spread-spectrum receivers," IEEE Trans. Communication, pp. 300-302, Mar. 1985.
Bouvier, "The rejection of large CW interferers in spread spectrum systems," IEEE Trans. Communication, pp. 254-256, Feb. 1978.

* cited by examiner

*Primary Examiner* — Jaison Joseph
(74) *Attorney, Agent, or Firm* — Kilpatrick Townsend & Stockton LLP (57) ABSTRACT

A method for interference estimation and mitigation includes receiving a high-resolution digital signal. The high-resolution digital signal comprises a signal of interest and an interfering signal. An estimate of the interfering signal is generated using a quantizer. The signal of interest is in a quantization noise of the quantizer. An interference-mitigated signal of interest is generated based on a difference of the estimate of the interfering signal and the high-resolution digital signal.

20 Claims, 5 Drawing Sheets

METHODS AND SYSTEMS FOR INTERFERENCE ESTIMATION VIA QUANTIZATION IN SPREAD-SPECTRUM SYSTEMS

FIELD OF THE INVENTION

The present invention relates to spread-spectrum communication systems that are subject to interference, which may degrade system performance, and the estimation and mitigation of said interference. The interference may be due to existing in-band communications or intentional interference, i.e. jamming.

BACKGROUND

Figure 1:
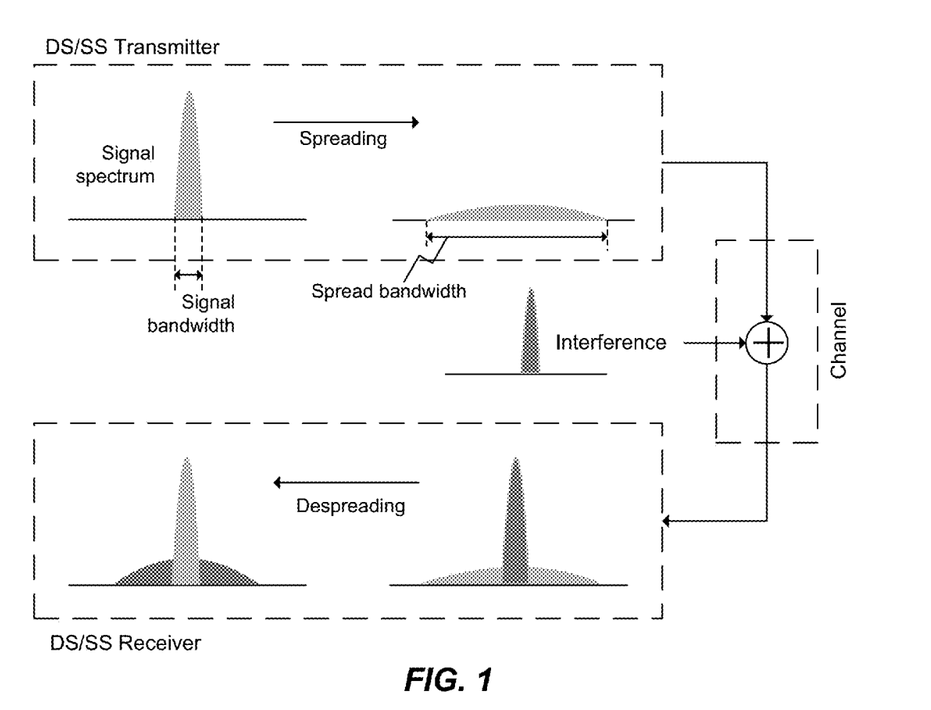
FIG. 1 is a simplified block diagram of a DS/SS system depicting the evolution of the signal spectrum through the transmitter and receiver.

The mitigation of interference in direct-sequence spread-spectrum (DS/SS) systems has been studied expansively in the prior art. In a DS/SS system, the transmitted bit sequence is multiplied by a spreading sequence (operating at a higher rate than the bit rate of the bit sequence). As shown in FIG. 1, this spreading operation spreads the original bandwidth of the transmitted signal of interest (the signal bandwidth) over a wider range (the spread bandwidth). At the receiver, the incoming signal, comprising both the wideband signal of interest and an interfering signal that is added in the channel, is multiplied by a synchronized copy of the spreading sequence (in an operation that is referred to as despreading), which removes the impact of spreading on the signal of interest. Since the interfering signal was not spread by the spreading sequence, the despreader acts as a spreader for the interfering signal.

In an example, as shown in the DS/SS receiver in FIG. 1, the interfering signal is concentrated in a small band of frequency within the spread bandwidth of the signal of interest, and the despreading operation spreads this interfering signal over the entire spread bandwidth of the signal of interest. As a result, only a small fraction of the interfering signal power will be contained in the unspread (or original) bandwidth of the signal of interest after the despreader. For a large class of interfering signals, not limited to narrowband interferers, the ultimate effect on the signal of interest is well approximated as broadband Gaussian noise with significantly less power than the interfering signal. A DS/SS system is inherently able to reject interference and is often used in environments that require this capability.

In an effort to further improve performance in DS/SS systems, the interference may be mitigated prior to despreading the received signal using a number of different techniques. In addition to methods that comprise notch filtering a narrowband interfering signal to mitigate interference in the received signal (see, for example, Milstein, "Interference rejection techniques in spread spectrum communications," Proc. of the IEEE, vol. 76(6), pp. 657-670, June 1988), approaches based on subtracting an estimate of the interference from the received signal have also been developed (see, for example, Baier and Friederichs, "A nonlinear device to suppress strong interfering signals with arbitrary angle modulations in spread-spectrum receivers," IEEE Trans. Communication, pp. 300-302, Mar. 1985 and Bouvier, "The rejection of large CW interferers in spread spectrum systems," IEEE Trans. Communication, pp. 254-256, February 1978).

SUMMARY

In comparison with these prior art techniques, the manner in which the estimate is obtained using embodiments of the present invention is quite different. Embodiments of the present invention generate an estimate of the interfering signal via quantization, wherein the received signal comprises the wideband signal of interest and the interfering signal, and the signal of interest lies in the quantization noise of the quantizer.

Embodiments of the present invention are directed to methods and systems for the estimation of interference via quantization and its mitigation. For example, in one embodiment, a method for interference estimation and mitigation comprises: receiving a high-resolution digital signal, wherein the high-resolution digital signal comprises a signal of interest and an interfering signal; generating an estimate of the interfering signal using a quantizer, wherein the signal of interest is in a quantization noise of the quantizer; and generating an interference-mitigated signal of interest based on a difference of the estimate of the interfering signal and the high-resolution digital signal.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

Like labels are used to refer to the same or similar modules in the drawings.

DETAILED DESCRIPTION

Digitizing modules, such as quantizers and analog-to-digital converters (ADCs), may be defined by a dynamic range and a resolution, which define the signal amplitudes that can be resolved by the digitizing module, as well as the quantization noise of the digitizing module. In other words, the dynamic range is defined as the range between the noise floor of a digitizing module and its specified maximum output level. In an example, an ADC with a 60 dB dynamic range can resolve signal amplitudes from $\Delta$ to 1000 $\Delta$. The dynamic range of the ADC is specified in bits; e.g. an ADC with a q-bit resolution resolves $2^q$ signal amplitudes, each separated by $\Delta$, resulting in a dynamic range of approximately 6q decibels (dB). That is, an ADC with a 10-bit resolution can provide an accurate digital representation of an analog signal with a dynamic range of up to 60 dB. The difference between the quantized value of a signal and its original value is known as the quantization error or quantization noise. When the signal amplitude is smaller than $\Delta$, the signal is said to be in the quantization noise.

Figure 2:
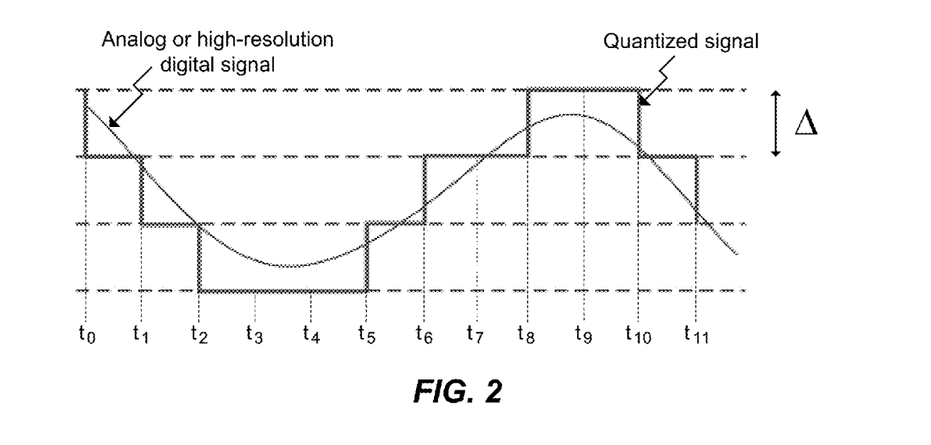
FIG. 2 is a snapshot illustrating the quantization of an analog signal or a high-resolution digital signal.

FIG. 2 illustrates a basic example of signal quantization, wherein an analog signal or high-resolution digital signal is processed by a 2-bit quantizer, with resolution (or quantization bin size) $\Delta$. At each time instant from $t_0, \ldots, t_{11}$, the quantizer converts the instantaneous value of the analog or high-resolution digital signal to the closest of the four quantization levels, thereby generating the quantized signal.

Figure 3:
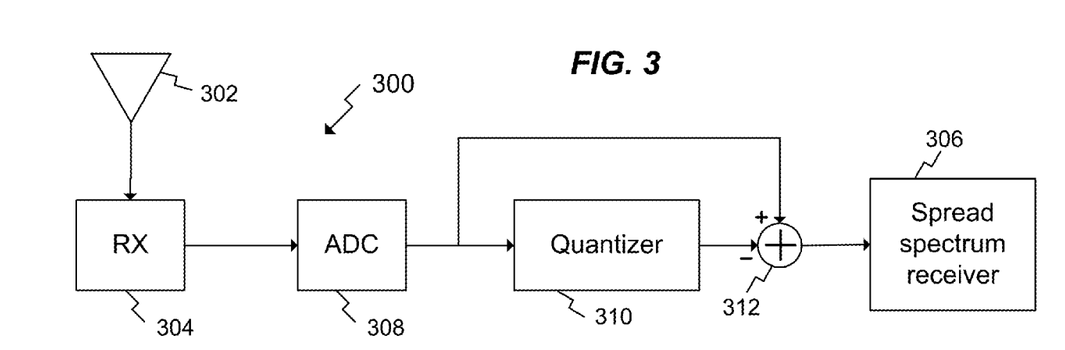
FIG. 3 is a simplified block diagram of an embodiment for estimation of interference via quantization and its mitigation, according to an embodiment of the present invention.

FIG. 3 depicts an embodiment of a system 300 for the estimation of interference via quantization and its mitigation. A receiver 304 has an analog input that comprises a signal of interest s(t) and an interfering signal I(t), which is received via an antenna 302. The analog signal is digitized using an analog-to-digital converter (ADC) 308, producing a high-resolution digital signal. The high-resolution digital signal is quantized using a quantizer 310, and the output of the quantizer is an estimate of the interfering signal since the signal of interest is in the quantization noise of the quantizer. This estimate of the interfering signal is subtracted from the high-resolution digital signal using a summer 312, and an interference-mitigated signal of interest is produced. The interference-mitigated signal of interest is processed by a spread-spectrum receiver 306. Thus, a signal of interest, comprising a level of interference that the spread-spectrum receiver 306 might not have been able to overcome solely based on its inherent ability to reject interference, may now be despread, demodulated and decoded since the level of interference has been mitigated by the embodiments described in the present invention.

In an embodiment, the quantizer 310 may be a memoryless quantizer, e.g. a simple low-resolution quantizer, wherein the present output of the quantizer is a function of only the present input to the quantizer. The memoryless quantizer may have a resolution that is lower than that of the ADC 308. That is, the analog signal is initially digitized by a high-resolution ADC that is capable of capturing both the large interfering signal and the small signal of interest, and the quantizer with the lower resolution is used to generate an estimate of the interfering signal since, due to its lower resolution, the signal of interest is in the quantization noise of the quantizer 310.

The memoryless quantizer may operate in concert with an automatic gain control (AGC) module, which scales the input analog signal prior to digitization by the ADC. The gain scale used by the AGC is based on the dynamic range of the ADC to ensure that the analog signal can be fully represented in the dynamic range of the ADC; i.e. there is no clipping or saturation of the received signal, which is dominated by the interfering signal. In other embodiments, the gain scale may be selected to allow up to 10% signal clipping, with the caveat that the estimation of the interference via quantization and its subsequent mitigation is not substantially degraded. This embodiment comprising the memoryless quantizer may be preferred when the interfering signal has a limited peak-to-average power ratio (PAPR), which results in the power of the interfering signal remaining relatively constant with respect to the time constant of the AGC module.

In an embodiment, the quantizer 310 may be a vector quantizer, that is, a quantizer with memory, such as a trellis-coded quantizer, a block-coded quantizer, or a predictive quantizer. In other embodiments, the memoryless and/or vector quantizer may be implemented using uniform or non-uniform quantization functions.

Figure 4:
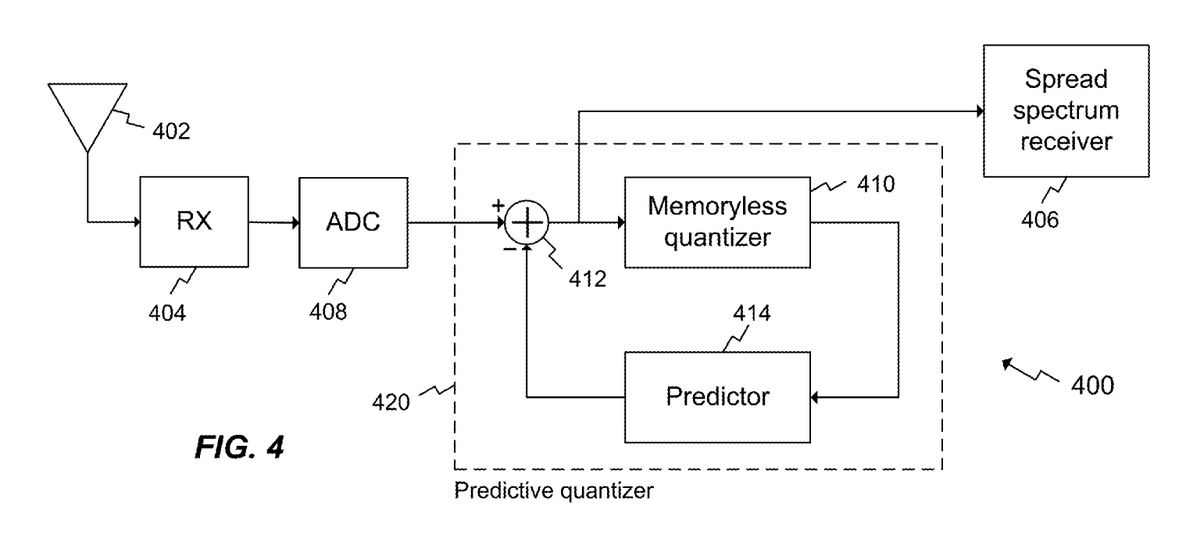
FIG. 4 is a simplified block diagram of another embodiment for estimation of interference via quantization and its mitigation, according to an embodiment of the present invention.

FIG. 4 depicts another embodiment of a system 400 for the estimation of interference via quantization and its mitigation. This embodiment includes some features and/or components that are similar to those shown in FIG. 3 and described above. At least some of the features and/or components may not be separately described in this section. The system 400 comprises a predictive quantizer, which has a very high effective dynamic range due to its ability to track a time-varying interfering signal. As shown in FIG. 4, the predictive quantizer comprises (i) a predictor 414 that produces an estimate of the interfering signal based on previous samples of the digital signal, (ii) a summer 412 that subtracts the estimate of the interfering signal from the high-resolution digital signal to produce the interference-mitigated signal of interest (which is also the quantization error), and (iii) a memoryless quantizer 410.

The dynamic range of the predictive quantizer, which enables it to track the interfering signal, is a function of the resolution of the memoryless quantizer 410, which may have a lower quantization resolution than the high-resolution ADC 408, and the specific predictor that is implemented. The predictive quantizer may be an embodiment of the quantizer 310 shown in FIG. 3. Intuitively, the interference-mitigated signal of interest (which is also the quantization error), which is a measure of the fidelity of the estimate of the interfering signal, enables the predictive quantizer to track the amplitude of the interfering signal as it changes over time. That is, the predictive quantizer is able to ensure that the signal of interest remains in the quantization noise, even as the amplitude of the interfering signal varies over time. This ability enables its operation in situations where the interfering signal has higher PAPRs, e.g. in the presence of a narrowband interfering signal.

In an embodiment, the predictor 414 may be a first- or second-order linear predictor, whose filter taps may be computed online by measuring the autocorrelation function of the digitized received signal. In another embodiment, the predictive quantizer may be a 1-bit sigma-delta quantizer. That is, the predicted interfering signal at a current time t generated by the predictor 414 is:

$$\hat{x}(t) = \hat{x}(t-\epsilon) + \delta b_t,$$

where $\hat{x}(t-\epsilon)$ is the predicted interfering signal at a previous time t–$\epsilon$, and $b_t$ is either +1 or –1, depending on the sign of the previously quantized prediction error, $(x(t-\epsilon)-\hat{x}(t-\epsilon))$. Other predictors may be used in some embodiments.

Figure 5:
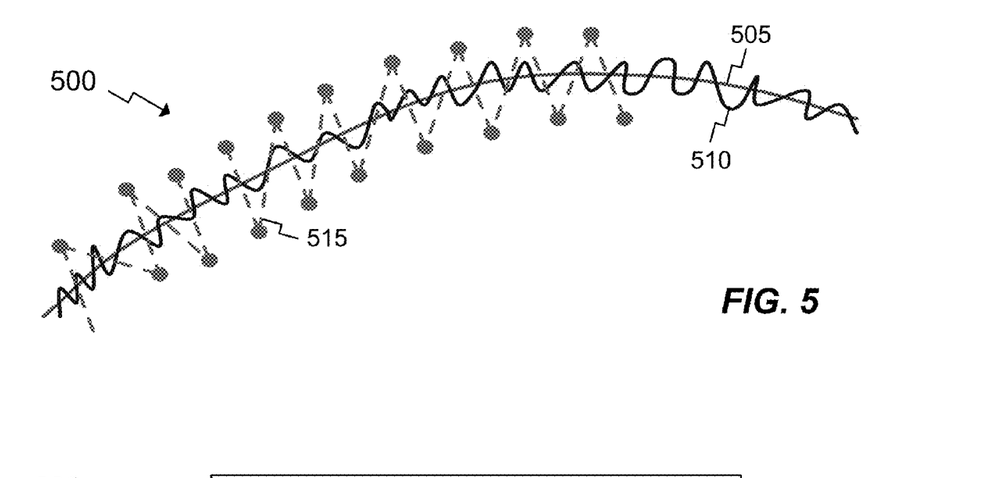
FIG. 5 is a snapshot illustrating the operation of an embodiment for estimation of interference via quantization and its mitigation, according to an embodiment of the present invention.

FIG. 5 illustrates a snapshot of the operation of the embodiments described above, in the context of FIG. 4, where in the example, a 1-bit quantizer with two levels is discussed. The received signal 510 comprises a wideband signal of interest and a strong time-varying interfering signal 505. As described in the embodiment above, the received signal 510 may first be processed by the ADC 408, and then subsequently processed by the predictive quantizer. By tracking the strong interfering signal 505 via the predictor 414, the predictive quantizer ensures that the signal of interest remains in its quantization range, which is akin to the predictive quantizer being able to infinitely extend its dynamic range. Subtracting the estimate of the interfering signal 515 from the received signal 510 generates the interference-mitigated signal of interest. The interference estimation and mitigation abilities of the various embodiments described in the present invention may not be sufficient in and of themselves to overcome interfering or jamming signals, but work in concert with the inherent ability of a spread-spectrum receiver to reject interference, so as to ensure the resilience of the combined system against stronger interferers.

Figure 6:
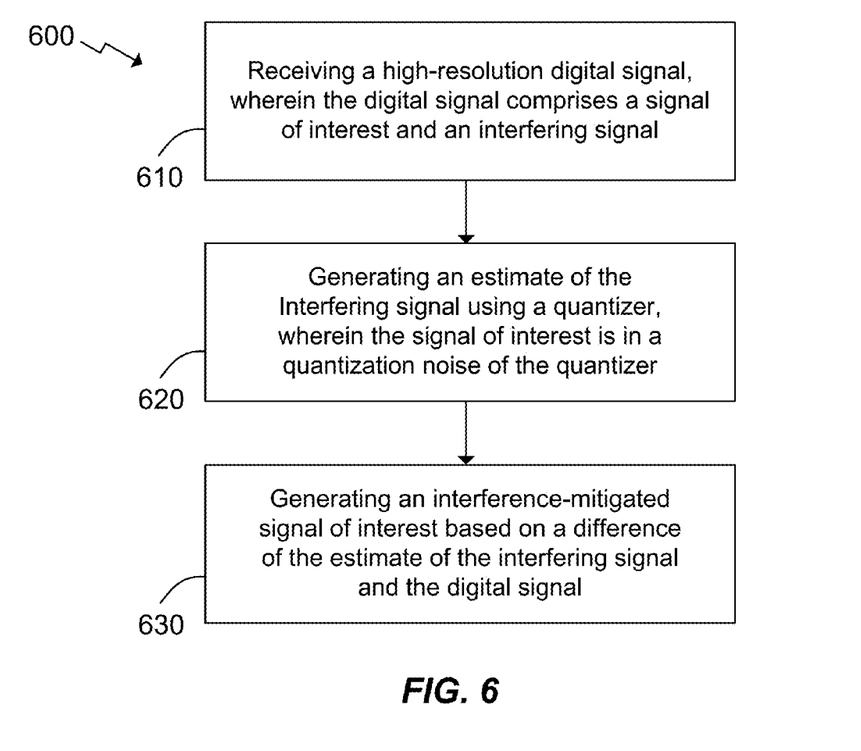
FIG. 6 is a flowchart for a method for estimation of interference via quantization and its mitigation, according to an embodiment of the present invention.

FIG. 6 is a flowchart of a method for the estimation of interference via quantization and its mitigation, according to an embodiment of the present invention. In some embodiments, the order of steps may be changed. Furthermore, some of the steps in the flowchart may be skipped or additional steps added. With reference to FIGS. 3 and 4, the method 600 begins at step 610 when a high-resolution digital signal comprising a signal of interest and an interfering signal is received. In an embodiment, the high-resolution digital signal may further comprise thermal noise and/or other channel impairments. In another embodiment, the signal of interest is a wideband spread-spectrum signal, and the interfering signal has a narrow bandwidth, compared to the spread bandwidth, and a power that is significantly larger than that of the signal of interest.

In an embodiment, the high-resolution digital signal may not be readily available and may be generated by digitizing a received analog signal using a high-resolution ADC. The ADC will have a dynamic range and resolution that enables it to generate accurate digital representations of both the signal of interest as well as the strong interfering signal. The analog signal may be digitized by the ADC with minimal signal clipping or none at all.

At step 620, an estimate of the interfering signal is generated using a quantizer, wherein the signal of interest is in the quantization noise of the quantizer. In an embodiment, the quantizer has a lower resolution than the ADC. That is, the higher-resolution ADC captures both the interfering signal and the signal of interest, whereas the lower-resolution quantizer captures only the interfering signal since the signal of interest is in its own quantization noise, thereby generating an estimate of the interfering signal. In another embodiment, the signal of interest may not exist entirely within the quantization noise. That is, an estimate of the interfering signal may be generated even when the magnitude variations of the signal of interest minimally exceed the resolution $\Delta$ of the quantizer.

At step 630, an interference-mitigated signal of interest is generated based on the difference of the estimate of the interfering signal and the high-resolution digital signal. In an embodiment, the digital signal is quantized using a memoryless quantizer to generate an estimate of the interfering signal, which is subtracted from the digital signal to generate the interference-mitigated signal of interest. In another embodiment, the difference of the digital signal and the output of a predictive quantizer is the interference-mitigated signal of interest.

Figure 7:
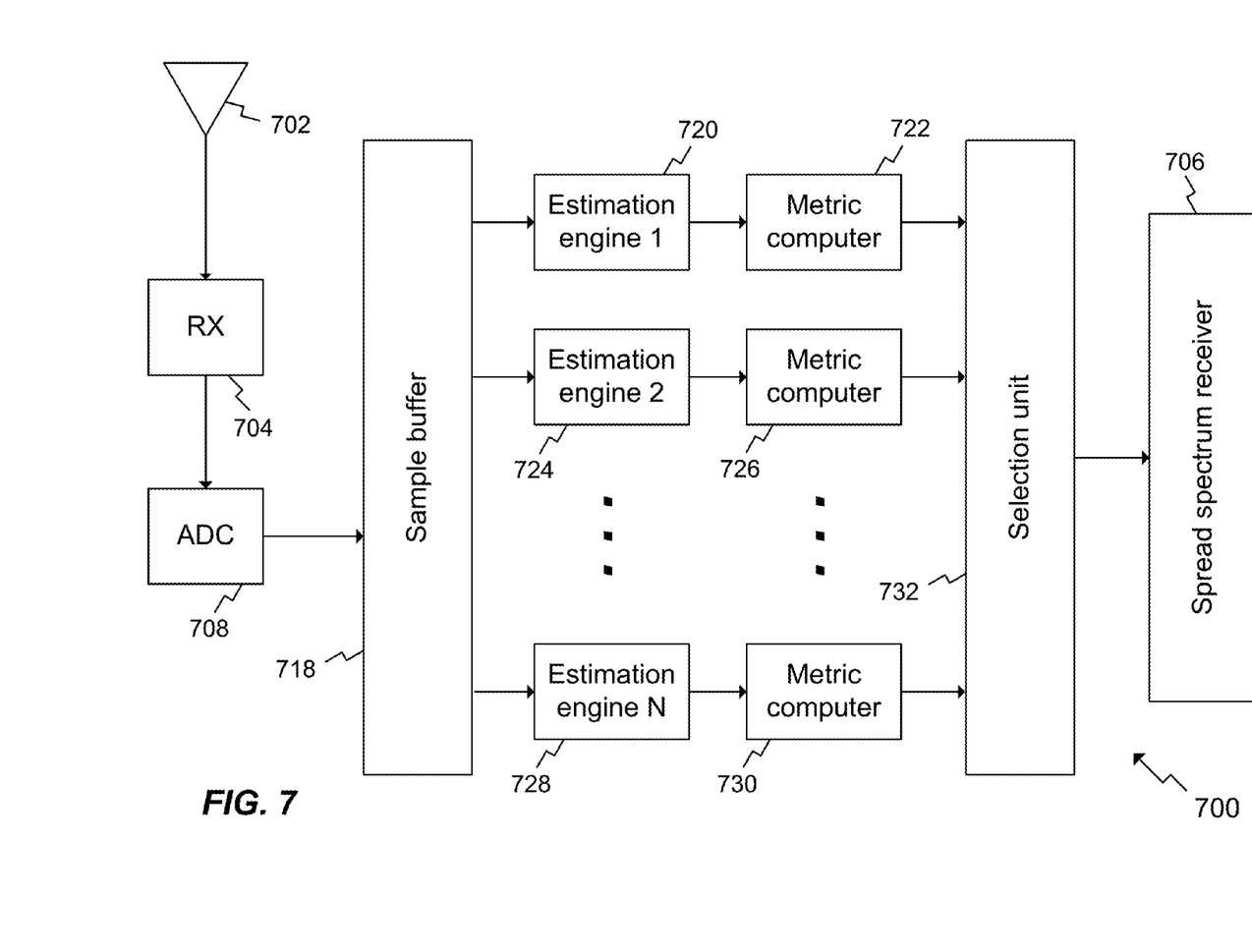
FIG. 7 is a simplified block diagram of a system comprising the means for estimation of interference via quantization and its mitigation, according to an embodiment of the present invention.

FIG. 7 is a block diagram of a system that implements a method for estimation of interference via quantization and its mitigation, according to an embodiment of the present invention. This embodiment includes some features and/or components that are similar to those shown in FIGS. 3 and 4 and described above. At least some of these features and/or components may not be separately described in this section.

As shown in FIG. 7, the system 700 comprises a sample buffer 718 that stores the digitized samples of the received analog signal comprising the signal of interest and the interfering signal. In an embodiment, the high-resolution digital signal is processed by a plurality of estimation engines (720, 724 . . . , and 728), each of which generates an interference-mitigated signal of interest. Each of the estimation engines may have a different quantization resolution, which enables at least one of the estimation engines to process the digital signal in a manner that ensures that the signal of interest is in the quantization noise of the quantizer in that estimation engine. At least one of the estimation engines (720, 724 . . . , and 728) enables the estimation of interference via quantization and its mitigation as described in the present invention.

Since it is possible to accurately assess the performance of an estimation engine using an empirical estimate of a post-quantization signal metric, the system 700 further comprises a plurality of metric computers (722, 726 . . . , and 730). Each of the generated interference-mitigated signals of interest is processed by the corresponding metric computer that computes the post-quantization signal metric. The set of metrics is processed by a selection unit 732, which outputs one of the interference-mitigated signals of interest based on the set of computed metrics. In an embodiment, the metric may be a signal-to-interference-plus-noise ratio (SINR). The selected interference-mitigated signal of interest is subsequently processed by a spread-spectrum receiver 706.

Figure 8:
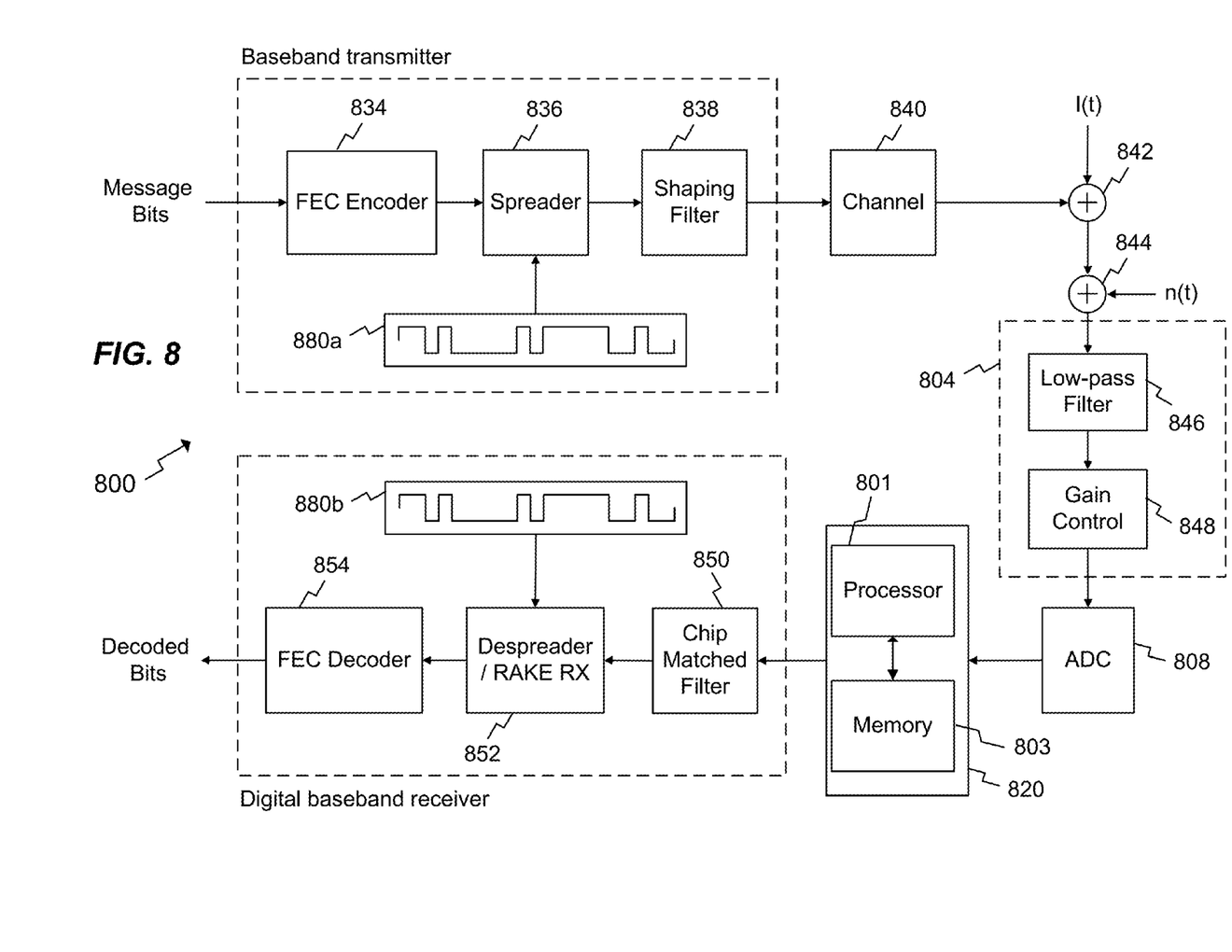
FIG. 8 is a simplified block diagram of another system comprising the means for estimation of interference via quantization and its mitigation, according to an embodiment of the present invention.

FIG. 8 is a block diagram of another system that implements a method for estimation of interference via quantization and its mitigation. This embodiment includes some features and/or components that are similar to those shown in FIGS. 3, 4 and 7 and described above. At least some of these features and/or components may not be separately described in this section. The system 800 is a DS/SS system that comprises a baseband transmitter, a channel model and a receiver for spread-spectrum communication. The system 800 is representative of a DS/SS system that may incorporate the embodiments described herein for interference estimation via quantization and mitigation, but the methods and embodiments of the present invention are applicable to any DS/SS receiver.

As shown in FIG. 8, message bits arriving at R bits/sec are input to the baseband transmitter, which employs a forward error-correction code (FEC) to encode the message bits. The output of the FEC encoder 834 is a stream of coded message bits at $R_b$ bits/sec ($R_b$>R), which may optionally be modulated, and are then multiplied by a spreading sequence in a spreader 836. A spreading sequence generator 880a generates the spreading sequence at $R_c$ bits/sec, wherein $R_c$ is greater than $R_b$, and the ratio $R_c/R_b$ is known as the spreading factor. In an embodiment, the spreading sequence is a binary sequence, whereas in another embodiment, the spreading sequence is a non-binary spreading sequence. The output of the spreader 836 is filtered by a shaping filter 838 to produce a transmission signal with the desired bandwidth. The signal is transmitted through a channel 840, and is subject to additive interference and noise (implemented via summers 842 and 844, respectively).

The received signal, which comprises the transmitted signal (the signal of interest) and the interfering signal, is initially processed by a receiver 804 that comprises a low-pass filter 846 and a gain control unit 806. The scaled analog signal is digitized by an ADC 808, and then processed by a module for interference estimation via quantization and mitigation 820, which comprises a processor 801 and memory 803. The interference-mitigated signal of interest is then filtered by a chip-level matched filter 848, which is matched to the shaping filter 838 in the baseband transmitter. The filtered signal is despread and demodulated using a despreader and Rake receiver 852, which employs a spreading sequence generator 880b. The spreading sequence generator 880b in the digital baseband receiver is independent of, but synchronized to, the spreading sequence generator 880a in the baseband transmitter. Note that synchronization modules that are required for spread-spectrum signal reception and processing have been omitted from this discussion for clarity. The demodulated bits are finally processed by an FEC decoder 852 to generate the decoded bits.

In an embodiment, the module 820 operates at the chip or sub-chip level. Interference estimation via quantization and its mitigation, prior to despreading and demodulation, complements the inherent ability of the spread-spectrum system to reject interference via the spreading gain of the system. That is, if the spreading gain of the DS/SS system is unable to combat the level of perceived interference, interference estimation and mitigation via the embodiments described in the present invention mitigates the interference to a level that the spreading gain is able to overcome. In another embodiment, and in addition to the processor 801 and memory 803, the module 820 may comprise a plurality of estimation engines with different quantization resolutions, and the post-quantization signal metric that is computed may be the chip-level signal-to-noise ratio (SNR) or the chip-level signal-to-distortion ratio (SDR).

The processor 801 may comprise component digital processors, and may be configured to execute computer-executable program instructions stored in memory 803. For example, the component digital processors may execute one or more computer programs for enabling the estimation of interference via quantization and its mitigation in accordance with embodiments of the present invention.

Processor 801 may comprise a variety of implementations for quantization, interference estimation, signal prediction and signal combining, including one or more microprocessors, digital signal processors (DSPs), application-specific integrated circuits (ASICs), field programmable gate arrays (FPGAs), state machines, or the like. Processor 801 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 803 may comprise a non-transitory computer-readable medium that stores instructions which, when executed by the processor 801, cause the processor 801 to perform various steps, such as those described herein. Examples of computer-readable media include, but are not limited to, electronic, optical, magnetic, or other storage or transmission devices capable of providing the processor 801 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 801 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for interference estimation and mitigation, the method comprising:
   receiving a high-resolution digital signal, wherein the high-resolution digital signal comprises a signal of interest and an interfering signal, and wherein the high-resolution digital signal is generated based on an analog-to-digital converter;
   quantizing the high-resolution digital signal in a quantizer, wherein the signal of interest is in a quantization noise of the quantizer;
   generating an estimate of the interfering signal at the quantizer and outputting the estimate of the interfering signal from the quantizer, wherein a resolution of the analog-to-digital converter is higher than a resolution of the quantizer; and
   generating an interference-mitigated signal of interest based on a difference between the estimate of the interfering signal and the high-resolution digital signal.

2. The method of claim 1, the method further comprising:
   receiving an analog signal; and
   digitizing the analog signal, using the analog-to-digital converter, to generate the high-resolution digital signal.

3. The method of claim 2, wherein the analog signal is fully represented in a dynamic range of the analog-to-digital converter.

4. The method of claim 1, wherein the quantizer is a memoryless quantizer, and wherein the high-resolution digital signal is quantized to generate the estimate of the interfering signal.

5. The method of claim 1, wherein the quantizer is a predictive quantizer, and wherein the estimate of the interfering signal is based on previous samples of the high-resolution digital signal.

6. The method of claim 1, wherein the signal of interest is a spread-spectrum signal.

7. The method of claim 6, wherein the quantizer operates at a chip-level prior to despreading and demodulating the spread-spectrum signal.

8. An apparatus for interference estimation and mitigation, the apparatus comprising:
   a receiver configured to receive a high-resolution digital signal, wherein the high-resolution digital signal comprises a signal of interest and an interfering signal, and wherein the high-resolution digital signal is generated based on an analog-to-digital converter; and
   a quantizer configured to quantize the high-resolution digital signal and generate an estimate of the interfering signal at the quantizer and output the estimate of the interfering signal from the quantizer, wherein the signal of interest is in a quantization noise of the quantizer, wherein a resolution of the analog-to-digital converter is higher than a resolution of the quantizer, and wherein an interference-mitigated signal of interest is generated based on a difference between the estimate of the interfering signal and the high-resolution digital signal.

9. The apparatus of claim 8, further comprising:
a front-end receiver configured to receive an analog signal, and
the analog-to-digital converter is configured to digitize the analog signal to generate the high-resolution digital signal.

10. The apparatus of claim 9, further comprising:
an automatic gain control (AGC) unit configured to scale the analog signal based on a dynamic range of the analog-to-digital converter, and wherein the analog signal is fully represented in the dynamic range of the analog-to-digital converter.

11. The apparatus of claim 10, wherein the quantizer is a memoryless quantizer, and wherein the high-resolution digital signal is quantized to generate the estimate of the interfering signal.

12. The apparatus of claim 8, wherein the signal of interest is a spread-spectrum signal.

13. The apparatus of claim 12, further comprising:
a despreader configured to despread the spread-spectrum signal, wherein the quantizer operates at a chip-level prior to despreading the spread-spectrum signal.

14. The apparatus of claim 8, wherein the quantizer is a predictive quantizer, and wherein the estimate of the interfering signal is based on previous samples of the high-resolution digital signal.

15. An apparatus for interference estimation and mitigation, the apparatus comprising:
a receiver configured to receive a high-resolution digital signal, wherein the high-resolution digital signal comprises a signal of interest and an interfering signal, and wherein the high-resolution digital signal is generated based on an analog-to-digital converter;
a plurality of estimation engines configured to generate a plurality of interference-mitigated signals of interest; and
a selection unit configured to select one of the plurality of interference-mitigated signals of interest, wherein at least one of the plurality of estimation engines comprises a quantizer configured to quantize the high-resolution digital signal and generate an estimate of the interfering signal at the quantizer and output the estimate of the interfering signal from the quantizer, wherein the signal of interest is in a quantization noise of the quantizer, wherein a resolution of the analog-to-digital converter is higher than a resolution of the quantizer, and wherein one of the plurality of interference-mitigated signals of interest is generated based on a difference between the estimate of the interfering signal and the high-resolution digital signal.

16. The apparatus of claim 15, further comprising:
a front-end receiver configured to receive an analog signal, and
the analog-to-digital converter is configured to digitize the analog signal to generate the high-resolution digital signal.

17. The apparatus of claim 15, wherein the quantizer is a memoryless quantizer, and wherein the high-resolution digital signal is quantized to generate the estimate of the interfering signal.

18. The apparatus of claim 17, further comprising:
a plurality of metric computers,
wherein each of the plurality of metric computers is configured to compute a metric for a corresponding one of the plurality of interference-mitigated signals of interest.

19. The apparatus of claim 18, wherein the selection unit is further configured to select the one of the plurality of interference-mitigated signals of interest based on the metrics computed by each of the plurality of metric computers.

20. The apparatus of claim 18, wherein the metric is a signal-to-interference ratio, and wherein the one of the plurality of interference-mitigated signals of interest with a maximum value of the signal-to-interference ratio is selected.

* * * * *